W. A. FLOWER AND L. H. WEILHEIMER.
MOTOR METER AND RADIATOR CAP LOCK.
APPLICATION FILED MAY 31, 1918.
1,306,143.
Patented June 10, 1919.
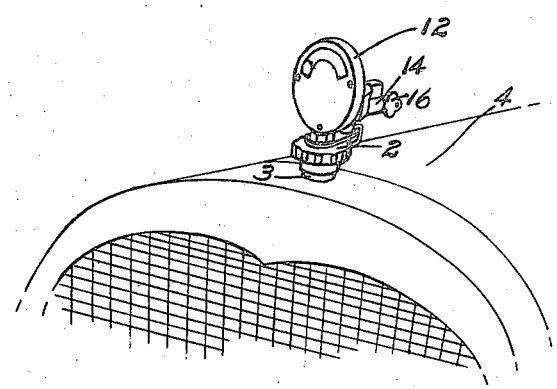
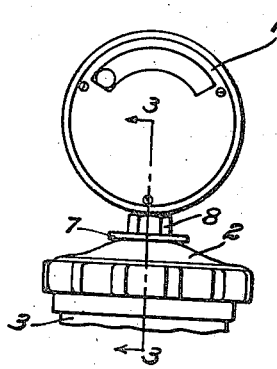
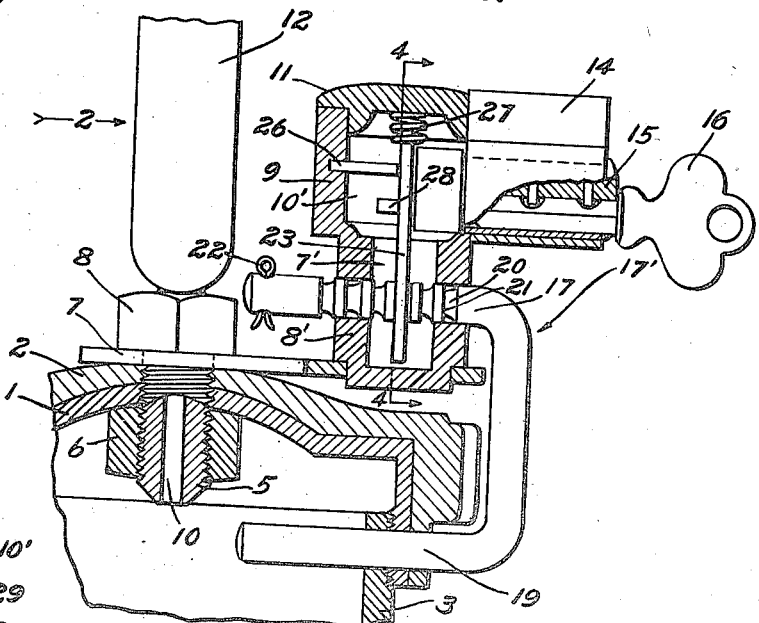
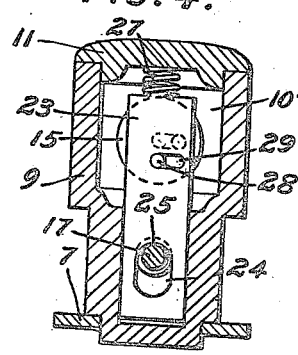
INVENTORS
WILLIAM A. FLOWER
LOUIS H. WEILHEIMER
BY Hazard and Miller
ATT'YS.

UNITED STATES PATENT OFFICE.

WILLIAM A. FLOWER AND LOUIS H. WEILHEIMER, OF FRESNO, CALIFORNIA.

MOTOR-METER AND RADIATOR-CAP LOCK.

1,306,143.  Specification of Letters Patent.  Patented June 10, 1919.

Application filed May 31, 1918. Serial No. 237,609.

*To all whom it may concern:*

Be it known that we, WILLIAM A. FLOWER and LOUIS H. WEILHEIMER, citizens of the United States, residing at Fresno, in the county of Fresno and State of California, have invented new and useful Improvements in Motor-Meters and Radiator-Cap Locks, of which the following is a specification.

Our object is to make a motor meter and radiator cap lock and our invention consists of the novel features herein shown, described and claimed.

Figure 1 is a fragmentary front perspective of a radiator having a cap and motor meter secured in place by a lock embodying the principles of our invention.

Fig. 2 is a front elevation of the motor meter and lock, the radiator being broken away.

Fig. 3 is an enlarged sectional detail on the line 3—3 of Fig. 2.

Fig. 4 is a sectional detail on the line 4—4 of Fig. 3.

The metal cap 1 has a cover 2 of hard rubber or the like and the cap 1 is screw-seated upon the upper end of the filling nipple 3 of the radiator 4. The hollow nipple 5 is screwed down through the center of the cap 1 and cover 2 and a jam nut 6 is placed upon the lower end of the nipple 5 within the cap. The lock base 7 fits upon the cover 2 and the nipple 5 is inserted downwardly through the lock base 7; there being a square head 8 upon the upper end of the nipple to engage the base 7 and clamp it to the cover 2 and cap 1. The head 8 is made rigid with the base 7 by soldering, brazing or the like. The port 10 extends upwardly through the nipple 5 and through the head 8 to the interior of the motor meter 12; said motor meter 12 being rigidly fixed upon the head 8.

The motor meter 12 is in the nature of a thermometer for indicating the condition of the water in the radiator. If the motor meter is mounted upon a cap and the cap screwed upon the radiator it is an easy matter for the thief to unscrew the cap and carry away the motor meter, and it is the principal object of our present invention to lock the cap carrying the motor meter to the radiator.

The housing 8' is rigidly fixed to the base 7 and extends upwardly a short distance behind the motor meter 12; there being a chamber 7' extending downwardly into the housing 8'. The head 9 is formed integral with the upper end of the housing 8' and has a chamber 10' communicating with the chamber 7'. A cap 11 is fixed to the head 9 to close the chamber 10'.

The escutcheon cylinder 14 of the lock is rigidly connected or formed integral with the head 9. The key cylinder 15 is rotatably mounted in the escutcheon cylinder 14 and extends into the chamber 10'. A key 16 fits in the key cylinder 15. The locking bar 17' comprises the arm 17, the arm 18 extending at right angles from the arm 17, and the arm 19 extending at right angles from the arm 18 and parallel with the arm 17. The arm 17 has grooves 20 extending around its central portion and said grooves have squared locking shoulders 21. The arm 17 is inserted horizontally and diametrically through the housing 8' and through the chamber 7', and a cotter pin 22 is inserted through the tip of the arm 17 to prevent the arm from being withdrawn and lost. The arm 19 is inserted through the screw-threaded portion of the cap 1 and through the screw-threaded portion of the filling nipple 3 to hold the cap from being unscrewed. The dog 23 is placed in the chamber 10' and has a vertically elongated slotted opening 24 through which the arm 17 extends, and the edge 25 at the top of the opening 24 is adapted to engage one of the squared shoulders 21 to hold the arm 17 from being withdrawn. A pin 26 is placed in the upper end of the chamber 10' to guide the upper end of the dog 23. A spring 27 is placed between the upper end of the dog 23 and the lower face of the cap 11, the tension of the spring being exerted to hold the dog down against the arm 17. A pin 28 is fixed eccentrically in the inner end of the key cylinder 15 and extends through a slot 29 in the dog 23. The pin 28 is preferably set in the key cylinder 15 so that when the key 16 is removed the pin 28 will be in its lowermost position pressing the dog 23 firmly against the arm 17 in one of the grooves 20 to engage a shoulder 21 and hold the arm 17 from being withdrawn from the housing 8', thereby holding the arm 19 from being withdrawn from the cap and thereby locking the motor meter to the cap and locking the cap to the radiator.

When the key 16 is inserted into the cylinder 15, a quarter turn of the key one way will raise the dog 23 to release the arm 17, and if the cotter pin 22 is removed the arm 17 may be withdrawn and the cap unscrewed for filling the radiator.

We prefer to fix the key cylinder 15 so that the key will only turn in one direction.

The motor meter 12 is so close to the lock mechanism that it cannot be rotated to unscrew the motor meter from the cap. Furthermore the base 7 may be brazed, soldered, or otherwise fastened to the head 8, so that the motor meter cannot be removed from the cap when the lock is in place and the locking bar 17' in place.

Thus we have produced a motor meter and radiator cap lock to secure a motor meter to a radiator cap and secure the radiator cap to the radiator to prevent unauthorized removal of the motor meter from the radiator.

Various changes may be made without departing from the spirit of our invention as claimed.

We claim:

1. A motor meter and radiator cap lock comprising the combination with a motor meter, a radiator filling nipple, and a radiator cap, of a base rigid with the motor meter, a lock rigidly mounted upon the base, and a U-shaped bar having one arm inserted through the lock and the other arm inserted through the cap and nipple so as to lock the motor meter upon the cap and lock the cap upon the filling nipple.

2. A radiator having a filling nipple, a cap screw-seated upon the filling nipple; a motor meter having a base fitting upon the cap, a nipple extending through the cap, and a jam-nut upon the nipple below the cap; a lock rigidly mounted upon the base, and a U-shaped bar having one arm inserted in position to be locked and the other arm inserted through the cap and filling nipple so as to lock the motor meter upon the cap and lock the cap upon the filling nipple.

3. A motor meter having a rigid base, a screw-threaded nipple extending from the base, and a jam-nut upon the nipple; a lock rigidly mounted upon the base, and means adapted for connecting the lock to a radiator cap and filling nipple so as to lock the motor meter upon the cap and lock the cap upon the filling nipple.

4. The combination of a radiator filling nipple; a removable cap thereon; a motor meter mounted on the cap having a rigid base; and a means including a bolt for locking said base and said cap to the nipple.

In testimony whereof we have signed our names to this specification.

WILLIAM A. FLOWER.
LOUIS H. WEILHEIMER.